US006772661B1

(12) United States Patent
Mikkelsen et al.

(10) Patent No.: US 6,772,661 B1
(45) Date of Patent: Aug. 10, 2004

(54) METHOD AND APPARATUS FOR PRECISION CUTTING AND THE LIKE OF GRAPHICS AREAS FROM SHEETS

(75) Inventors: Steen Mikkelsen, Delavan, WI (US); Geo Andersen, Aabyhoej (DK)

(73) Assignee: Mikkelsen Graphic Engineering, Lake Geneva, WI (US)

( * ) Notice: Subject to any disclaimer, the term of this patent is extended or adjusted under 35 U.S.C. 154(b) by 50 days.

(21) Appl. No.: 09/678,594

(22) Filed: Oct. 4, 2000

Related U.S. Application Data

(60) Provisional application No. 60/157,640, filed on Oct. 4, 1999.

(51) Int. Cl.$^{7}$ .......................... B26D 5/00; G05B 15/00

(52) U.S. Cl. ...................... 83/13; 83/34; 83/39; 83/75; 83/76.8; 83/365; 83/368; 83/371; 700/134; 700/150; 700/167; 700/259; 347/157

(58) Field of Search ......................... 83/861, 862, 875, 83/879, 880, 881, 13, 22, 32, 34, 39, 52, 56, 72, 73, 74, 75, 75.5, 366, 76.8, 365, 76.9, 368, 371, 901, 936, 939, 940, 747; 700/114, 134, 213, 167, 150, 171, 230, 135, 259; 400/621; 347/157

(56) References Cited

U.S. PATENT DOCUMENTS 3,608,799 A 9/1971 Edson
3,805,650 A * 4/1974 Pearl ............................ 83/56
3,838,618 A 10/1974 Eissfeldt et al.
3,848,490 A 11/1974 Arel
3,855,887 A 12/1974 Pearl et al.
3,864,997 A 2/1975 Pearl et al.
4,380,944 A 4/1983 Gerber et al.
4,419,913 A 12/1983 Schutt et al.
4,494,435 A 1/1985 Lindsay
4,555,968 A * 12/1985 Raney et al. ................. 83/209
4,583,181 A * 4/1986 Gerber et al. .......... 250/559.46
4,680,083 A 7/1987 Kashiwaba
4,697,485 A 10/1987 Raney, Charles C.
4,704,927 A * 11/1987 Hirosawa ....................... 83/13
4,721,058 A * 1/1988 Hayamizu et al. ............ 118/39
4,768,410 A * 9/1988 Wood ......................... 235/489
4,882,961 A * 11/1989 Zabinski et al. .............. 83/177
4,901,359 A * 2/1990 Bruder .................. 235/462.01
5,074,178 A * 12/1991 Shetley et al. ................ 83/364
5,201,351 A 4/1993 Hurdle, Jr.
5,212,647 A 5/1993 Raney et al.
5,258,917 A * 11/1993 Bruder et al. ............... 348/125
5,333,111 A * 7/1994 Chaiken et al. ............. 382/111
5,537,135 A 7/1996 Hevenor et al.
5,551,786 A 9/1996 Webster et al.
5,644,979 A 7/1997 Raney
5,794,526 A * 8/1998 Raney .................... 100/229 R
5,838,569 A * 11/1998 Gane .......................... 700/134
5,937,725 A * 8/1999 Kamijo et al. ................. 83/56
6,192,777 B1 * 2/2001 Williams et al. ............... 83/56
6,205,370 B1 * 3/2001 Blaimschein et al. ....... 382/111

* cited by examiner

*Primary Examiner*—Boyer D. Ashley
(74) *Attorney, Agent, or Firm*—Jansson, Shupe & Munger, Ltd

(57) ABSTRACT

A method and apparatus for cutting a graphics area from a sheet of material which includes such graphics area. The method involves applying a plurality of registration marks on the sheet at and about the graphics area in predetermined positions at the time the graphics are applied thereto, sensing the locations of the registration marks on the sheet of material at the time of cutting, and cutting the graphics area from the ready-to-cut sheet along a path determined in response to the sensed locations positions of the registration marks with respect to the graphics area at that time, whereby precise cutting occurs despite two-dimensional distortion of the sheet prior to cutting.

27 Claims, 1 Drawing Sheet

METHOD AND APPARATUS FOR PRECISION CUTTING AND THE LIKE OF GRAPHICS AREAS FROM SHEETS

RELATED APPLICATION

This application is a continuation of application Ser. No. 60/157,640, filed on Oct. 4, 1999.

FIELD OF THE INVENTION

This invention is related generally to the field of cutting of graphics areas or the like from sheets for various purposes, and other narrow-path-processing about graphics areas on sheets.

BACKGROUND OF THE INVENTION

The technical field involving the cutting of graphic areas from sheets, or otherwise doing narrow-path-processing about graphics images on sheets, includes, for example, the face-cutting of laminate sheets to form decals. More specifically, a graphic-image area on the face layer of a laminate needs to be cut away from the remainder of the face layer so that the graphic area (decal) can subsequently be pulled away from the backing layer of the laminate and be applied elsewhere as intended. Highly accurate face-layer cutting about the graphics is obviously highly desirable.

This is but one example in which highly accurate sheet cutting is desirable. In many other situations, highly accurate sheet cutting which is desired may not involve face-cutting, but through-cutting, in which the full thickness of the sheet is cut about a graphics area on the sheet. And in many situations, rather than highly accurate cutting, highly accurate scoring, creasing, line embossing or the like, in each case, of course, along a line the varying direction of which is determined by the shape of the graphics area. Together these types of operations on sheets with respect to graphics areas thereon are referred to herein for convenience as "narrow-path-processing." For convenience, the prior art problems and the invention herein which solves such problems will be discussed primarily with reference to sheet-cutting apparatus.

Achieving extreme precision in locational accuracy in the cutting of sheets about graphics areas has been problematic. A variety of sheet-cutting methods, primarily involving various forms of die-cutting operations, have been used. However, the problem of achieving precision cutting has not been fully solved.

In some cases, various flatbed plotters are used. These are devices having a positionally-controlled cutting implement above a flat work surface on which the sheet to be cut rests. The cutting implements are controlled based on controller-supplied instructions based on the X-Y coordinates necessary to achieve cutting along the intended path, such as about the graphics area. However, these and other prior art devices have not been sufficient to achieve the high degree of precision that is desired, and that is achieved by the instant invention.

Among the particular problems in the art are problems related to distortion of the sheets between the time that graphics images are printed or otherwise applied thereon. More specifically, distortions in the sheet material caused by shrinkage or expansion of the sheet material after printing are common. This distortion, which is two-dimensional in nature, is particularly common and difficult when the sheets are of certain materials such as vinyl.

The problem of accurate cutting (or other narrow-path-processing) is exacerbated when, as is often the case, the graphics area or graphics areas to be cut from a sheet are very irregular in shape—i.e., with the perimeters of the graphic areas involving lines other than simple straight lines. When non-uniform shrinkage and/or expansion occurs, often by different amounts along different directions, and even by different amounts in different portions of a sheet along the same direction, achieving a precision cut is highly problematic. A sheet having such non-uniform distortions, e.g., a sheet which includes distorted portions and non-distorted portions or which includes multiple portions distorted by differing amounts and/or in differing directions, is significantly more difficult to accurately cut (or otherwise narrow-path-process) than a sheet which exhibits a non-varying distortion, e.g., a sheet which has uniformly expanded by a certain degree.

Therefore, a method and/or apparatus which overcomes non-uniform distortion to precisely cut graphic areas from sheets would be a significant advance. The invention is a marked improvement over sheet-cutting methods which assumed and accommodated non-varying distortion but were incapable of overcoming non-uniform, or varying, distortions.

OBJECTS OF THE INVENTION

It is an object of this invention to provide an improved method and apparatus for precision cutting of graphics areas from sheets, thereby overcoming some of the problems and shortcomings of the prior art.

Another object of this invention is to provide a method and apparatus for improved accuracy in cutting around graphics areas in order to fully adjust for two-dimensional distortion in the sheets from which the graphics areas will be cut.

Another object of the invention is to provide an improved method and apparatus for cutting about graphics areas which automatically adjust for a wide variety of sheet distortion, including non-uniform two-dimensional distortion and distortions of differing degrees in one dimension or along one direction.

Still another object of the invention is to provide a method and apparatus for accurate cutting about graphics areas on sheets on which graphics areas are placed by printing, which readily accommodate post-printing distortions in the sheet material.

Another object of this invention is to allow for more efficient use of sheet material.

Yet another object of this invention is to allow for rapid cutting of graphics areas from the sheet material.

Another object of this invention is to provided a method and apparatus for improved accuracy in cutting around graphics areas which is applicable to a wide variety of cutting implements.

Another object of this invention is to provide a method for cutting graphics images from sheets which dynamically adjusts for varying distortions at different positions across each sheet, including distortions occurring during cutting operations, if any.

Still other objects of this invention is to provide an improved method and apparatus for narrow-path-processing about graphics images on sheet materials of various kinds.

These and other objects of the invention will be apparent from the following descriptions and from the drawings.

SUMMARY OF THE INVENTION

The instant invention overcomes the above-noted problems and satisfies the objects of the invention. The invention is an improved method and apparatus for cutting graphics areas from sheets. Stated more broadly, the invention is an improved method and apparatus for narrow-path-processing about graphics images on sheets, including by cutting, creasing, scoring or the like. Of particular note is that the instant invention provides a high-precision accuracy in the cutting of graphics images from sheets bearing such images which overcomes a wide variety of variable distortion in the sheets, including two-dimensional distortions. Broadly speaking, the improved narrow-path-processing for sheets is highly accommodating to a wide variety of distortion, including unpredictable distortions, in sheets having graphics areas.

The method of this invention, stated with respect to cutting graphics areas from sheets including such graphics areas, includes as a first step applying a plurality of registration marks on the sheet at and about the graphics area in predetermined positions with respect to the graphics area, or more particularly, with respect to the perimeter thereof which will be cut. This is done at the time the graphics which define such graphics area (or graphics areas) are applied. The method involves sensing the locations of the registration marks on the sheet of material at the time of cutting—i.e., at the time that the precise cutting path is being determined, and cutting the graphics area from the ready-to-cut sheet in response to the positions of the registration marks with respect to the graphics area (i.e., its perimeter which is to be cut) at that time. This method allows cutting to occur very precisely despite non-uniform distortions of the sheet, including two-dimensional distortion of the sheet, prior to cutting.

In highly preferred embodiments, the method includes the additional step of placing the ready-to-cut sheet on a flatbed plotter having an X and Y coordinate grid and retaining the sheet on the flatbed plotter at a user-selected location thereon such the sheet of material overlaps the X and Y coordinate grid. In such situations, sensing the locations of the registration marks on the ready-to-cut sheet includes the step of determining the X and Y coordinates which are overlapped by the registration marks. Each of such registrations marks is typically a circular dot or the like, and once sensed, the input data readily allows determination of the true coordinates (with respect to the plotter grid) for the mathematical center of each mark. In such preferred embodiment, the cutting step preferably includes the step of comparing the X and Y coordinates which are overlapped by the registration marks with a reference set of X and Y coordinates, which were determined with respect to the printed graphics area and registration marks at the time of printing.

It is highly preferred that the method of this invention include providing a controller to perform the comparing step, so that the determinations involving sensing and comparing are carried out swiftly and on a continuing basis as one or more graphics areas are cut from a sheet. The controller has a programmed set of predetermined cutting instructions which includes the reference X and Y coordinates for the registration marks and the predetermined positions thereof with respect to the perimeter of the graphics area when the graphics area and registration marks are first applied to the sheet; and the cutting step further includes setting an optimized cutting path based on the comparing step, such optimized cutting path corresponding to the perimeter of the graphics area of the ready-to-cut sheet even though such perimeter is distorted during the uncut life of the sheet.

In many cases, as already suggested, and depending, of course, on the size of the sheet and the size of the graphics areas, it is preferred that there be a plurality of graphics areas on each sheet and a corresponding plurality of sets of the registration marks at or about each graphics area.

In certain preferred embodiments, the sheet is a laminate having (a) a face layer which bears one or more graphics areas and registration marks corresponding to each, and (b) a backing layer, and the cutting is face cutting only. This allows preparation of highly accurate decals, which can later be removed from the backing layer.

It is preferred, as already indicated, that the registration marks be applied during the printing of the graphics area(s) on a sheet; indeed, application of the registration marks is merely part of the printing process. In other words, a sheet can be accommodated to the method and apparatus of this invention by not additional steps other than the printing which occurs in any event.

The method described above applies to narrow-path-processing other than the preferred cutting, as described. Thus, the method applies to scoring, creasing, line embossing and the like.

In preferred embodiments, the registration marks are applied outside of the perimeter of the graphics area. However, registration marks can be inside or outside of the graphics area. As used herein, the phrase "at and about" means that the marks are generally at the graphics design and near it. This combination of words does not require that marks be either inside or outside a graphics area, and does not imply that there must be marks both inside and outside, because that is not the case.

During operation of the method of this invention, a predetermined cutting path which matches the perimeter of the graphics area as originally printed, is deviated from only to the extent dictated by the changing relationships of the marks with respect to one another. Based on such changing relationships, a resulting path adjustment occurs and occurs on a continuing basis, to obtain the most accurate cutting path.

The apparatus of this invention is a device for cutting a graphics area at the perimeter thereof from a ready-to-cut sheet of material which was prepared for such cutting beforehand, at the time of its printing, by the placement of a number of registration marks at and about the graphics area. Such placement is simply by the addition of such marks in the printing.

A sheet will have at least four, but preferably more, registration marks with at least three around each individual graphics area to be cut from the sheet. The registration marks are adjacent to, but not contiguous with, the perimeter of the graphics area. The precise number of registrations marks depends on the number of adjustments which are desired in the cutting path during the cutting of a graphics area from the sheet.

The inventive apparatus includes: (1) a flatbed plotter having an upper surface for receiving the ready-to-cut sheet thereon; (2) a sensor, preferably a CCD area image sensor, operatively connected to the flatbed plotter for moving along the upper surface thereof, the sensor serving to sense the locations of the registration marks; and (3) a cutter operatively connected to the sensor and movable about the upper surface of the flatbed plotter, the cutter serving to cut the graphics area from the ready-to-cut sheet in response to the locations of the registration marks sensed by the sensor. The invention, as already indicated, serves to assure that cutting occurs precisely where intended despite any two-dimensional distortion which has occurred in the sheet prior to cutting. The apparatus preferably includes a vacuum structure, as is known in the art, for retaining the sheet in position on the flatbed plotter.

In preferred embodiments, the apparatus also includes a controller which operatively links the cutter to the sensor. The controller controlling movement of the cutter along the upper surface of the flatbed plotter. The controller includes a set of predetermined cutting instructions in it corresponding to the perimeter of the graphics area and the predetermined position thereof with respect to predetermined positions of the registration marks when the graphics area and registration marks are first applied to the sheet. The controller moves the cutter along the upper surface of the flatbed plotter in response to a comparison of (a) the locations of the registration marks sensed by the sensor on the ready-to-cut sheet with (b) the set of predetermined cutting instructions.

In preferred embodiments, the flatbed plotter has an X and Y coordinate grid associated with the surface upon which a sheet to be cut lies. The sensor transmits to the controller the X and Y coordinates of the grid which are overlapped by the registration marks. The controller includes a set of predetermined cutting instructions programmed therein which define reference X and Y coordinates for the registration marks and the predetermined positions thereof with respect to the perimeter of the graphics area. The controller moves the cutter along the upper surface of the flatbed plotter in response to a comparison of (a) the X and Y coordinates of the registration marks of the ready-to-cut sheet as received from the sensor with (b) the reference X and Y coordinates of the registration marks in the set of predetermined cutting instructions.

Broadly speaking, the information received by the controller from the sensor is compared to the format and content of information which it has stored in it. The stored information includes the cutting path corresponding to the perimeter of the graphics area when printed. Such nominal cutting path is, of course, a collection of information defined in X and Y coordinates. The controller compares the actual distance between the three registration marks which are closest to a particular point on the nominal cutting path (i.e., the perimeter as intended), and adjusts the cutting final cutting path according to the changes over the relative positions of these registration marks as determined when printed on the cutting sheet. The adjustments are made by making changes in the X and Y coordinates of points along the line to be cut.

While a cutter apparatus is described, the same arrangements are in apparatus for narrow-path-processing (about a graphics area) other than cutting, as noted above.

Referring again to cutting apparatus, in summary, a cutting device has a sensor which senses the locations of the registration marks on a sheet, and a cutter is operatively connected to the sensor and is movable about the upper surface of a flatbed plotter to effect cutting along an adjusted correct path. The cutter cuts the graphics area from the sheet of material in response to the locations of the registration marks sensed by the sensor. A controller operatively connects the cutter to the sensor, and controls the movement of the cutter along the upper surface of the flatbed plotter. This is done by using a set of preprogrammed cutting instructions in the controller; the controller moves the cutter along the upper surface of the flatbed plotter in response to a comparison between the set of predetermined cutting instructions, which include the nominal locations of the registration marks and the nominal cutting path, and the actual locations of the registration marks as sensed by the sensor.

More specifically, the flatbed plotter has an X and Y coordinate grid, and the sensor transmits to the controller the X and Y coordinates of such grid which are overlapped by the registration marks. The set of predetermined cutting instructions within the controller includes reference X and Y coordinates for each registration mark with respect to a graphics area. The controller moves the cutter along the upper surface of the flatbed plotter in response to a comparison between the reference X and Y coordinates of the registration marks defined in the set of predetermined cutting instructions and the X and Y coordinates received in the sensor.

It should be noted that the sheet of material can be placed on the flatbed plotter at a user-selected position, as long as it fully overlaps the X and Y coordinate grid of the flatbed plotter. The sheet is retained in the user-selected position, preferably by a vacuum device causing the sheet to stay in place. It is the X and Y coordinates which the registration marks overlap that are determined and compared with a reference set of X and Y coordinates and, as already noted, a controller performs the step of comparing the X and Y coordinates overlapped by the registration marks with the reference set of X and Y coordinates.

DETAILED DESCRIPTION OF PREFERRED EMBODIMENTS

Figure 1:
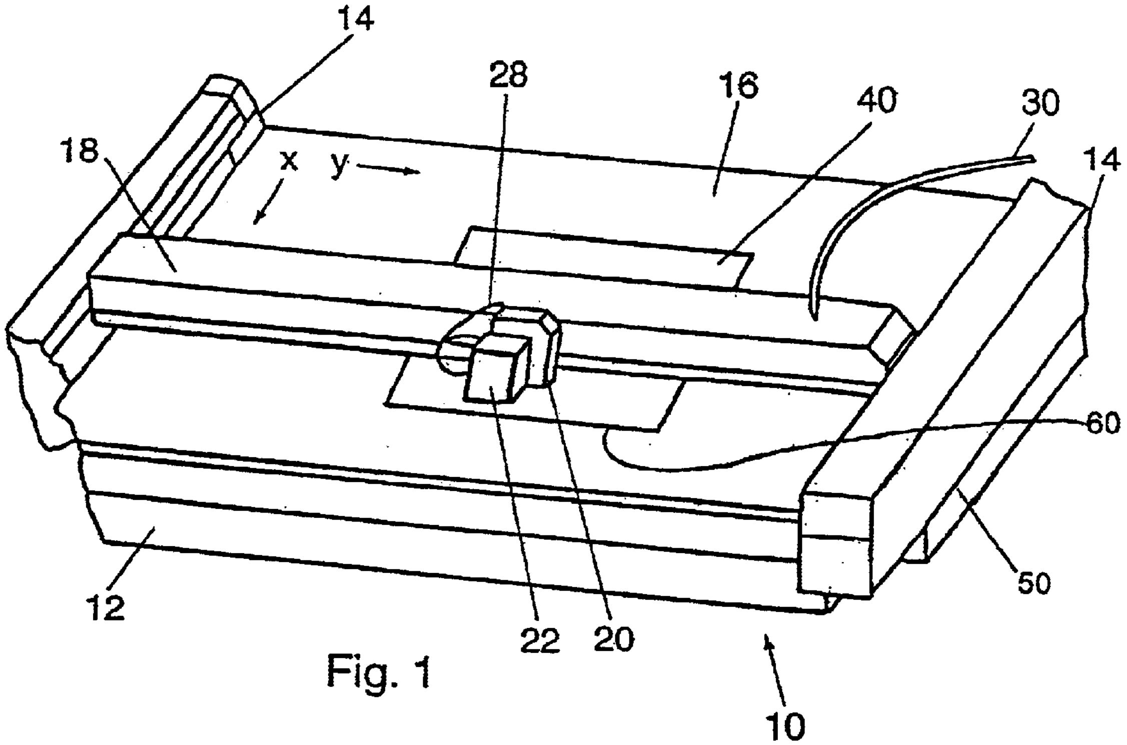
FIG. 1 is a perspective view of an automatically controlled cutting apparatus employing the present invention.

Referring to FIG. 1, a partially cut away view of a cutting device 10 is shown. Cutting device 10 has a housing 12 which may contain the control system (not shown) and a working surface 16. Cutting device 10 is also known as a flatbed plotter or cutter in the art and may be a Zund plotter, manufactured by Zund System Technik HG, or a Wild plotter, to give two examples.

The working surface cutting device 10 is shown with a sheet 40 positioned on it. Cutting device 10 is shown with two longitudinal guide rails 14 mounted thereon. A transverse member 18 is suspended between longitudinal guide rails 14. Transverse member 18 is driven by a motor (not shown) along guide rails 14. A cutting tool 20 rides on transverse member 18. Cutting tool 20 has a cutting knife (not shown).

A sensor or detector 22 is shown attached to cutting tool 20. While sensor or detector 22 is shown attached to cutting tool 10, it is not necessary for it to be attached to it. Cutting tool 20 moves along transverse member 18 and is driven by a motor (not shown). Cutting tool 20 is capable of moving laterally or longitudinally along working surface 16. Cutting tool 20 may have pressure and tangential controlled tungsten carbide blades, tungsten carbide blades, other blades that are generally known or lasers, which are not shown. The cutter driver (not shown) which controls cutting tool 20 is standard and is known in the art.

Figure 2:
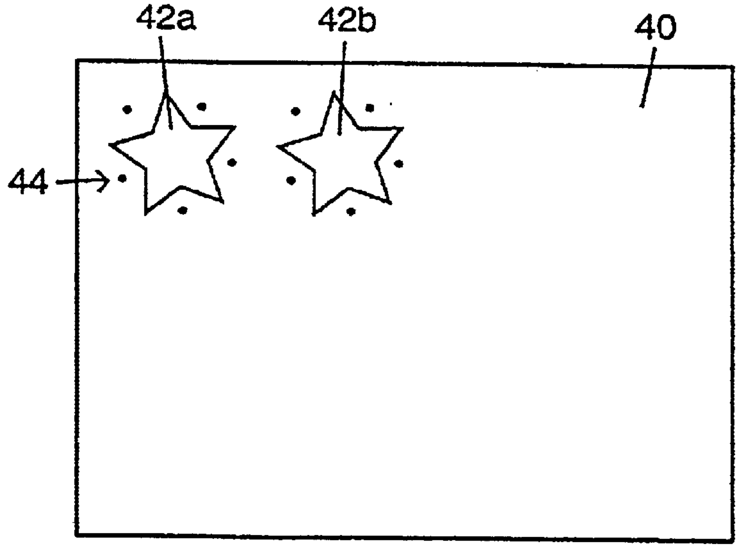
FIG. 2 is a top view of a sheet of sheet material with pre-printed graphics areas and registration marks.

Sensor or detector 22 may be an optical detector responsive to registration marks on sheet 40. Referring to FIG. 2, registration marks 44 are pre-printed on sheet 40. Registration marks 44 are pre-printed circles, filled or unfilled, of equal size. They may be anywhere from 3 mm to 12 mm in diameter, with a preferred outer diameter of 6.3 mm. The color of the registration marks is such as to create sufficient contrast to the background of the sheet material.

Sheet 40 has many registration marks 44 preprinted thereon, including several around each of the graphics areas **42*a* and 42*b* which are intended to be cut from sheet 40. Registration marks 44 are adjacent to, but not contiguous with, the perimeters of preprinted graphics areas 42*a* and 42*b***.

Sensors 22 are connected to the input of controller 50 by cables 28 and 30. Controller 50 is also connected to and drives cutting tool 20. Controller 50 receives the input external data and compares it to the format and content of information which it has stored in it. For each graphics area **42*a* and 42*b*, the information stored in controller 50 is the location of the perimeter of the graphics area relative to the locations of registration marks 44 as printed on sheet 40. Specifically, it controller 50 has the position of the registration marks 44** and the intended cutting path defined in X-Y coordinates.

The controller compares the actual distance between the three registration marks (44) which are closest to a point on the intended cutting point, and adjusts the cutting path according to the changes between these registration marks using the information for their locations when printed on sheet 40. The adjustments are made by making changes in the X-Y coordinates of points along the cutting path.

The sensor or detector 22 may be a CCD camera, which is known in the art. The cutter drivers (not shown) are also known in the art. In operation, sensor 22 is caused to be positioned over a registration mark 44. Sensor 22 finds the mathematical center of a registration mark 44 and defines its position in X-Y coordinates of work surface 16. Two other registration marks 44 are located and their centers are defined by X-Y coordinates in like manner.

These data are inputted to the controller where the actual locations of registration marks 44 on ready-to-be-cut sheet 40 are compared to those of the registration marks in the predetermined cutting instructions. The predetermined cutting path which is a collection of X-Y coordinate sets is adjusted according to the actual X-Y coordinates of registration marks 44. These comparisons are made interactively throughout the cutting process, making the process a dynamic process.

The cutting path is adjusted according to the actual coordinates of the three registration marks 44 closest to a cutting point. When the cutting of an individual graphics area is completed, cutting tool 20 is caused to be lifted and moved to the next graphics area and the process is repeated.

In the operating mode, sheet material 40 is placed on working surface 16 and may be held in place by a vacuum 60 which acts through the working surface. The cutting of graphics areas 42*a* and 42*b* is effected by movement of computer-controlled cutting tool 20 and computer-controlled transverse rail 18. The predetermined cutting instructions contained in the controller are based upon the graphics area which was originally printed on sheet 40. The cutting path is defined in X-Y coordinates.

As already noted, sensor 22 finds the locations of registration marks 44 and defines them in X-Y coordinates. This information is compared to the predetermined X-Y coordinates of the registration marks, and the cutting path along the perimeters of the graphics areas are adjusted according to the changes in the location of the three registration marks are closest to each cutting point. The cutting path is optimized and modified dynamically as the cutting proceeds.

The method and apparatus of this invention have a wide range of applications in a variety of industries. While the invention is applicable to sheets, it must be borne in mind that sheets can be individual sheets or simply planar portions of a roll which remain attached to the roll. The invention also has application to sheets in the form of curved surfaces, in certain situations. Furthermore, the applicability of the invention is not limited to any particular kind or form of sheet.

While the principles of this invention have been described in connection with specific embodiments, it should be understood clearly that these descriptions are made only by way of example and are not intended to limit the scope of the invention.

What is claimed is:

1. The combination of an apparatus for cutting a graphics area at the perimeter thereof and a ready-to-cut sheet of material having a plurality of registration marks at and/or around the graphics area, comprising:

a flatbed plotter having an upper surface for receiving the ready-to-cut sheet of material thereon;

sensing means operatively connected to the flatbed plotter for moving along the upper surface thereof and for sensing locations of the registration marks; and cutting means for receiving the locations of the registration marks from the sensing means and for precisely cutting around the graphics area to remove the graphics area from the ready-to-cut sheet of material based upon the locations of the registration marks sensed by the sensing means such that the cutting means overcomes non-uniform distortions of the sheet of material prior to cutting, the cutting means operatively connected to the sensing means and movable about the upper surface of the flatbed plotter.

2. The apparatus of claim 1 wherein the sensing means is a CCD area image sensor.

3. The apparatus of claim 1 further comprising a vacuum structure adapted to retain the sheet of material in position on the flatbed plotter.

4. The apparatus of claim 1 further comprising controller means for controlling movement of the cutting means along the upper surface of the flatbed plotter, the controller means operatively connecting the cutting means to the sensing means.

5. The apparatus of claim 4 wherein the controller means includes a set of predetermined cutting instructions therein corresponding to the perimeter of the graphics area and a predetermined position thereof with respect to predetermined positions of the registration marks when the graphics area and registration marks are first applied to the sheet of material, the controller means including comparing means for comparing (a) the locations of the registration marks sensed by the sensing means on the ready-to-cut sheet of material with (b) the set of predetermined cutting instructions, and the controller means moves the cutting means along the upper surface of the flatbed plotter to enable the cutting means to precisely cut the graphics area from the ready-to-cut sheet of material despite non-uniform distortions of the sheet of material prior to cutting.

6. The apparatus of claim 4 wherein the flatbed plotter has X and Y coordinates.

7. The apparatus of claim 6 wherein the sensing means is adapted to transmit to the controller X and Y coordinates of the flatbed plotter which are overlapped by the registration marks.

8. The apparatus of claim 7 wherein the controller means includes a set of predetermined cutting instructions programmed therein which define reference X and Y coordinates for the registration marks and predetermined positions thereof with respect to the perimeter of the graphics area, the controller means including means for comparing (a) the X and Y coordinates of the registration marks of the ready-to-cut sheet of material with (b) the reference X and Y coordinates of the registration marks in the set of predetermined cutting instructions, and the controller means moves the cutting means along the upper surface of the flatbed plotter to enable the cutting means to precisely cut the graphics area from the ready-to-cut sheet of material despite non-uniform distortions of the sheet of material prior to cutting.

9. A method for cutting a graphics area from a sheet of material which includes such graphics area, comprising:

applying a plurality of registration marks on the sheet of material at and/or around the graphics area in predetermined positions with respect thereto at the time the graphics which define such graphics area are applied;

sensing the positions of the registration marks on the sheet of material at the time of cutting; and overcoming non-uniform distortions of the sheet of material prior to cutting by using the positions of the registration marks to precisely cut the graphics area from the sheet of material.

10. The method of claim 9 wherein the sheet of material has a plurality of graphics areas thereon and a corresponding plurality of sets of the registration marks.

11. The method of claim 9 wherein:

the sheet of material is a laminate having (a) a face layer bearing the graphics area and registration marks and (b) a backing layer; and the graphics area is precisely cut from the sheet of material by face cutting only.

12. The method of claim 11 wherein the sheet of material has a plurality of graphics areas thereon and a corresponding plurality of sets of the registration marks.

13. The method of claim 9 comprising the additional step of placing the sheet of material on a flatbed plotter having an X and Y coordinates and retaining the sheet of material on the flatbed plotter at a user-selected location thereon such that the sheet of material overlaps the X and Y coordinates of the flatbed plotter.

14. The method of claim 13 wherein the step of sensing the positions of the registration marks on the sheet of material includes the step of acquiring X and Y coordinates which are overlapped by the registration marks.

15. The method of claim 14 wherein the using step includes the step of comparing the X and Y coordinates which are overlapped by the registration marks with a reference set of X and Y coordinates.

16. The method of claim 15 further comprising the step of providing a controller to perform the comparing step.

17. The method of claim 16 wherein the controller has a programmed set of predetermined cutting instructions which includes the reference X and Y coordinates for the registration marks and the predetermined positions thereof with respect to the perimeter of the graphics area when the graphics area and registration marks are first applied to the sheet of material, and wherein the using step further includes setting an optimized cutting path based on the comparing step, such optimized cutting path corresponding to the perimeter of the graphics area of the sheet of material even though such perimeter is distorted after the applying step and before the using step.

18. A method for cutting a graphics area from a sheet of material which includes such graphics area, comprising:

while printing a graphics area on the sheet of material also printing a plurality of registration marks at and about the graphics area in predetermined positions with respect thereto;

placing the sheet of material on a flatbed plotter having X and Y coordinates and retaining the sheet of material at a user-selected location thereon such the sheet of material overlaps the X and Y coordinates of the flatbed plotter;

acquiring X and Y coordinates of the flatbed plotter which are overlapped by the registration marks; and using the acquired X and Y coordinates to precisely cut the graphics area from the sheet of material despite non-uniform distortions of the sheet of material prior to cutting.

19. The method of claim 18 comprising the additional step of providing a reference set of X and Y coordinates from a reference graphics area and reference registration marks.

20. The method of claim 19 wherein the using step includes the step of comparing the acquired X and Y coordinates which are overlapped by the registration marks with the reference set of X and Y coordinates.

21. The method of claim 20 further comprising the step of providing a controller to perform the step of comparing the acquired X and Y coordinates which are overlapped by the registration marks with the reference set of X and Y coordinates.

22. A method for narrow-path-processing about a graphics area from a sheet of material which includes such graphics area, comprising:

applying a plurality of registration marks on the sheet of material at and/or around the graphics area in predetermined positions with respect thereto at the time the graphics which define such graphics area are applied;

sensing locations of the registration marks on the sheet of material at the time of narrow-path-processing; and overcoming non-uniform distortions of the sheet of material prior to processing by precisely using the positions of the registration marks with respect to the graphics area to precisely narrow-path-process about the graphics area from the sheet of material.

23. The method of claim 22 wherein the graphics area is precisely narrow-path-processed from the sheet of material by a processing step selected from the group consisting of cutting, scoring, creasing and line embossing.

24. The method of claim 22 wherein the registration marks are round areas which have mathematical centers and the sensing step includes processing sensed data to find the mathematical centers thereof.

25. The method of claim 22 wherein the registration marks are applied outside of the perimeter of the graphics area.

26. The method of claim 22 wherein the sensing and resultant path adjustment occur repetitively during the narrow-path-processing.

27. The combination of an apparatus for narrow-path-processing around a graphics area at the perimeter thereof and a ready-to-process sheet of material having a plurality of registration marks at and/or around the graphics area, comprising:

a flatbed plotter having an upper surface for receiving the ready-to-process sheet of material thereon;

sensing means for sensing locations of the registration marks, the sensing means operatively connected to the flatbed plotter and adapted to move along the upper surface thereof; and narrow-path-processing means for moving about the upper surface of the flatbed plotter, receiving the locations of the registration marks from the sensing means and for precisely processing around the graphics area on the ready-to-process sheet of material based upon the locations of the registration marks sensed by the sensing means such that the narrow-path-processing means overcomes non-uniform distortions of the sheet of material prior to processing, the narrow-path processing means being operatively connected to the sensing means.

* * * * *